(12) United States Patent
Derakhshani (10) Patent No.: US 10,762,613 B2
(45) Date of Patent: Sep. 1, 2020

(54) CAPTURING IMAGES UNDER CODED ILLUMINATION PATTERNS TO REDUCE EFFECTS OF AMBIENT LIGHTING CONDITIONS

(71) Applicant: Alibaba Group Holding Limited, George Town (KY)

(72) Inventor: Reza R. Derakhshani, Shawnee, KS (US)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/795,464

(22) Filed: Feb. 19, 2020

(65) Prior Publication Data

US 2020/0193581 A1 Jun. 18, 2020

Related U.S. Application Data

(63) Continuation of application No. 16/182,372, filed on Nov. 6, 2018.
(Continued)

(51) Int. Cl.
*G06T 5/50* (2006.01)
*G06K 9/00* (2006.01)
(Continued)

(52) U.S. Cl.
CPC .......... *G06T 5/50* (2013.01); *G06K 9/00221* (2013.01); *G06K 9/2027* (2013.01); *G06T 5/005* (2013.01);
(Continued)

(58) Field of Classification Search
CPC ....... G06T 5/50; G06T 7/586; G06K 9/00885; G06K 9/00221
(Continued)

(56) References Cited

U.S. PATENT DOCUMENTS

2017/0091548 A1 3/2017 Agrawal et al.
2017/0176336 A1* 6/2017 Dimitriadis ............ G01N 21/80

FOREIGN PATENT DOCUMENTS

WO WO 2016131075 8/2016

OTHER PUBLICATIONS

PCT International Preliminary Report on Patentability in International Application No. PCT/US2018/059171, dated Feb. 3, 2020, 25 pages.
(Continued)

*Primary Examiner* — Jeffery A Williams
(74) *Attorney, Agent, or Firm* — Fish & Richardson P.C.

(57) ABSTRACT

The technology described in this document can be embodied in a method that includes receiving during a first time period, information from a first sensor representing a target illuminated by a first illumination source radiating in a first wavelength range, and information from a second sensor representing the target illuminated by a second illumination source radiating in a second wavelength range. The method also includes receiving during a second time period, information from the first sensor representing the target illuminated by the second illumination source radiating in the first wavelength range, and information from the second sensor representing reflected light received from the target illuminated by the first illumination source radiating in the second wavelength range. The method also includes generating a representation of the image in which effects due to the first and second illumination sources are enhanced over effects due to ambient light sources.

20 Claims, 5 Drawing Sheets

Related U.S. Application Data (60) Provisional application No. 62/582,743, filed on Nov. 7, 2017.

(51) Int. Cl.
| | |
|---|---|
| *H04N 5/235* | (2006.01) |
| *G06T 7/586* | (2017.01) |
| *G06T 15/00* | (2011.01) |
| *H04N 9/09* | (2006.01) |
| *G06K 9/20* | (2006.01) |
| *G06T 5/00* | (2006.01) |

(52) U.S. Cl.
CPC .............. *G06T 7/586* (2017.01); *G06T 15/00* (2013.01); *H04N 5/2351* (2013.01); *H04N 5/2354* (2013.01); *H04N 9/09* (2013.01); *G06T 2207/10024* (2013.01); *G06T 2207/10048* (2013.01); *G06T 2207/10152* (2013.01); *G06T 2207/20024* (2013.01)

(58) Field of Classification Search
USPC ........................................................ 348/164
See application file for complete search history.

(56) References Cited

OTHER PUBLICATIONS

PCT International Search Report and Written Opinion in International Application No. PCT/US2018/059171, dated Feb. 18, 2019, 15 pages.
PCT Written Opinion of the International Preliminary Examining Authority in International Application No. PCT/US2018/059171, dated Oct. 10, 2019, 4 pages.

\* cited by examiner

CAPTURING IMAGES UNDER CODED ILLUMINATION PATTERNS TO REDUCE EFFECTS OF AMBIENT LIGHTING CONDITIONS

PRIORITY CLAIM

This application is a continuation of U.S. application Ser. No. 16/182,372, filed on Nov. 6, 2018, which claims priority to U.S. Provisional Application No. 62/582,743, filed on Nov. 7, 2017, the entire contents of each of are incorporated herein by reference.

TECHNICAL FIELD

This disclosure relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document features a method for generating a representation of an image in which effects of ambient lighting conditions are reduced. The method includes receiving, from a first sensor, during a first time period, information representing reflected light received from a target, wherein the target is illuminated by a first illumination source radiating electromagnetic radiation in a first wavelength range, and receiving, from a second sensor, during the first time period, information representing reflected light received from the target, wherein the target is illuminated by a second illumination source radiating electromagnetic radiation in a second wavelength range. The second wavelength range is at least partially non-overlapping with the first wavelength range, and the second illumination source is spatially separated from the first illumination source. The method also includes receiving, from the first sensor, during a second time period, information representing reflected light received from the target, wherein the target is illuminated by the second illumination source radiating electromagnetic radiation in the first wavelength range, wherein the second time period is at least partially non-overlapping with the first time period. The method further includes receiving, from the second sensor, during the second time period, information representing reflected light received from the target, wherein the target is illuminated by the first illumination source radiating electromagnetic radiation in the second wavelength range. The method also includes generating, by one or more processing devices based at least on the information received from the first and second sensors, the representation of the image in which effects due to the first and second illumination sources are enhanced over effects due to ambient light sources separate from the first and second illumination sources.

In another aspect, this document features an imaging system that includes a first illumination source, a second illumination source, and one or more processing devices. The first and second illumination sources are each controllable to radiate electromagnetic radiation at multiple wavelength ranges, and the second illumination source disposed spatially separated from the first illumination source. The one or more processing devices are configured to receive, from a first sensor, during a first time period, information representing reflected light received from the target, wherein the target is illuminated by the first illumination source radiating electromagnetic radiation in a first wavelength range, and receive, from a second sensor, during the first time period, information representing reflected light received from the target, wherein the target is illuminated by the second illumination source radiating electromagnetic radiation in a second wavelength range. The second wavelength range is at least partially non-overlapping with the first wavelength range. The one or more processing devices are also configured to receive, from the first sensor, during a second time period, information representing reflected light received from the target, wherein the target is illuminated by the second illumination source radiating electromagnetic radiation in the first wavelength range. The second time period is at least partially non-overlapping with the first time period. The one or more processing devices are further configured to receive, from the second sensor, during the second time period, information representing reflected light received from the target, wherein the target is illuminated by the first illumination source radiating electromagnetic radiation in the second wavelength range, and generate, based at least on the information received from the first and second sensors, a representation of the image in which effects due to the first and second illumination sources are enhanced over effects due to ambient light sources separate from the first and second illumination sources.

In another aspect, this document features one or more machine-readable storage devices having encoded thereon computer readable instructions for causing one or more processing devices to perform various operations. The operations include receiving, from a first sensor, during a first time period, information representing reflected light received from a target, wherein the target is illuminated by a first illumination source radiating electromagnetic radiation in a first wavelength range, and receiving, from a second sensor, during the first time period, information representing reflected light received from the target, wherein the target is illuminated by a second illumination source radiating electromagnetic radiation in a second wavelength range. The second wavelength range is at least partially non-overlapping with the first wavelength range, and the second illumination source is spatially separated from the first illumination source. The operations also include receiving, from the first sensor, during a second time period, information representing reflected light received from the target, wherein the target is illuminated by the second illumination source radiating electromagnetic radiation in the first wavelength range, wherein the second time period is at least partially non-overlapping with the first time period. The operations further include receiving, from the second sensor, during the second time period, information representing reflected light received from the target, wherein the target is illuminated by the first illumination source radiating electromagnetic radiation in the second wavelength range. The operations also include generating, by one or more processing devices based at least on the information received from the first and second sensors, the representation of the image in which effects due to the first and second illumination sources are enhanced over effects due to ambient light sources separate from the first and second illumination sources.

Implementations of the above aspects can include one or more of the following features. The first and second time periods can constitute two bits of a binary code (e.g., a maximal correlation code) that is used in changing the illumination wavelengths of the first and second illumination sources. In case of a third wavelength range and illumination source, a tertiary-maximal-correlation codes can be used, and so forth. The representation of the image can be generated by executing a first matched filtering operation to detect the binary maximal correlation code on the information received from the first sensor, the first matched filtering being based on the binary code, and configured to enhance the effects of illumination by the first wavelength range over the effects of illumination by wavelengths outside the first wavelength range by way of having a maximal correlation code of certain length, for instance a Barker code. The representation of the image can be generated by executing a second matched filtering operation on the information received from the second sensor, the second matched filtering being based on the binary code, and configured to enhance the effects of illumination by the second wavelength range over the effects of illumination by wavelengths outside the second wavelength range. A sensitivity of the first sensor to light in the first wavelength range can be substantially higher than a sensitivity of the first sensor to light in the second wavelength range, and a sensitivity of the second sensor to light in the second wavelength range can be substantially higher than a sensitivity of the second sensor to light in the first wavelength range. The first sensor can include a red (R) or Blue (B) sensor of an RGB camera, and the second sensor can include a green (G) sensor of the RGB camera. Other configurations, such using spectral bands in the infrared range, are possible. The first wavelength range can be centered around a wavelength between wavelengths corresponding to red and blue, and the second wavelength range can be centered around a wavelength corresponding to green. Each of the first and second time periods can correspond to a frequency greater than or substantially equal to 120 Hz. A three dimensional (3D) representation of the target can be generated using a photometric stereo process on the information received from the first and second sensors, for example, using the information gleaned from the shading/illumination patterns, due to spatial separation of the first and second illumination sources with respect to the target being imaged.

The representation of the image can be processed to reduce effects of specular reflection. This can include identifying, in a first image generated based on the information from the first sensor, a region of reflection due to illumination using the first wavelength range, and replacing the pixel values in the region of reflection with pixel values corresponding to a second image generated based on information captured substantially concurrently by the second sensor. This can also include identifying, in a first image generated based on the information from the second sensor, a region of reflection due to illumination using the second wavelength range, and replacing the pixel values in the region of reflection with pixel values corresponding to a second image generated based on information captured substantially concurrently by the first sensor.

At least one of the first wavelength range or the second wavelength range can be within the near-infra-red (NIR) portion of the electromagnetic radiation spectrum. At least one of the first wavelength range or the second wavelength range can be in the 320-420 nm, or in the long wave UV or violet range, such as in the 400-460 nm range.

The imaging system described above can include a display device on which the representation of the image is presented. The first illumination source and the second illumination source can be disposed in a kiosk device. The imaging system can include a camera that includes the first and second sensors.

Various implementations described herein may provide one or more of the following advantages. By using at least two spatially separated illumination sources to generate temporally and spectrally non-overlapping illumination sequences, camera sensors can be used to concurrently obtain at least two separate images, each under a different illumination. The individual images, each of which is obtained using a corresponding known illumination, can then be used to enhance the effects due to system illumination over the effects due to the illumination from the environment. This in turn may be used to generate images that are substantially independent of ambient illumination. In some cases, such ambience-independent images may improve accuracy and/or efficiency of biometric identification systems, for example, by reducing false positives and/or false negatives, respectively. In some cases, the images acquired under the coded-light illumination can be used to generate three dimensional representations of the subject, for example, using photometric stereo technologies. In some cases, by carefully tailoring the wavelength ranges used in the multispectral illumination sources, features (e.g., micro features in the eye or face) that are otherwise undetectable, may be detected. This in turn can potentially improve the underlying biometric authentication systems and/or the usability of such systems in various applications. For example, the technologies described herein may be used in spoof detection, to reduce specular reflections and/or glare from images, and in various other applications.

Repeat use of reference characters in the present specification and drawings is intended to represent same or analogous features or elements.

DETAILED DESCRIPTION

This document describes technology that may allow for capturing images that are substantially independent of ambient lighting conditions. Various biometric identification/authentication systems are based on capturing one or more images, which are then compared with or analyzed with reference to template images captured during an enrollment process. For example, a biometric authentication system that uses face identification may require enrolling users to pose for one or more images of their face during an enrollment process. The images captured during the enrollment process may be stored on a storage device accessible to the biometric authentication system. During run-time, a facial image of a user can be captured and compared with one or more template images to determine if the user may be identified/verified. In some cases, the disparity in ambient illumination between the template image and the image captured during run-time may adversely affect the accuracy and/or efficiency of the underlying biometric authentication system. For example, while the template images may be captured in a controlled illumination setting during the enrollment process, there may be little or no control on the illumination when capturing the run-time image. For instance, if a biometric authentication system is deployed in a kiosk-type device such as an automated teller machine (ATM), and a camera disposed in the kiosk is used to capture run-time images of users, the ambient illumination can affect the captured images significantly. In such cases, the capture of run-time images can depend on various factors, including for example, the location of the kiosk, the time of the day, and/or the location of external illumination sources such as electric lights or windows with respect to the kiosk. These factors may cause shadows, highlights etc. to appear in the captured image, which in turn may affect the accuracy and/or efficiency of the underlying biometric authentication system, for example by adversely affecting the false positive and/or the false negative rates.

The technology described herein allows for mitigating the effect of ambient illumination on captured images by illuminating the target with a coded illumination sequence radiated from two or more spatially-separated sources. By processing the images captured under the coded illumination sequence, the effect of the controlled sources can be enhanced over the effects of the ambient illumination is such a way that the latter effects are substantially reduced in the final images, making the images appear to be substantially independent of the ambient illumination. When used in subsequent biometric processing, such images may improve the accuracy and/or efficiency of the underlying biometric authentication technology. Multiple images captured under illumination by different spatially-separated light sources may be used to generate a 3D representation of the target using photometric stereo reconstruction techniques. Such 3D representations may in turn be used in spoof-detection, for example, by differentiating from 2D images of the same target. In some implementations, the technology may also be used to determine that the target is indeed a live human being, for example by detecting the reflection of the controlled illumination sources on the cornea of the target. In some implementations, the technology may also be used in mitigating or substantially eliminating the reflection of the controlled light sources on eyeglasses worn by target, which in turn may improve the underlying biometric authentication process. In some implementations, the wavelength ranges used in illuminating the target may also be carefully selected to detect particular features in the target. For example, near-infrared (NIR) wavelengths may be used for detecting eye vasculature which may not be as detectable under other wavelengths, and/or wavelengths in the 320-460 nm range may be used in detecting periocular micro-features like freckles. The different sets of features captured under the specifically tailored illumination may in turn improve the underlying biometric authentication system.

Figure 1:
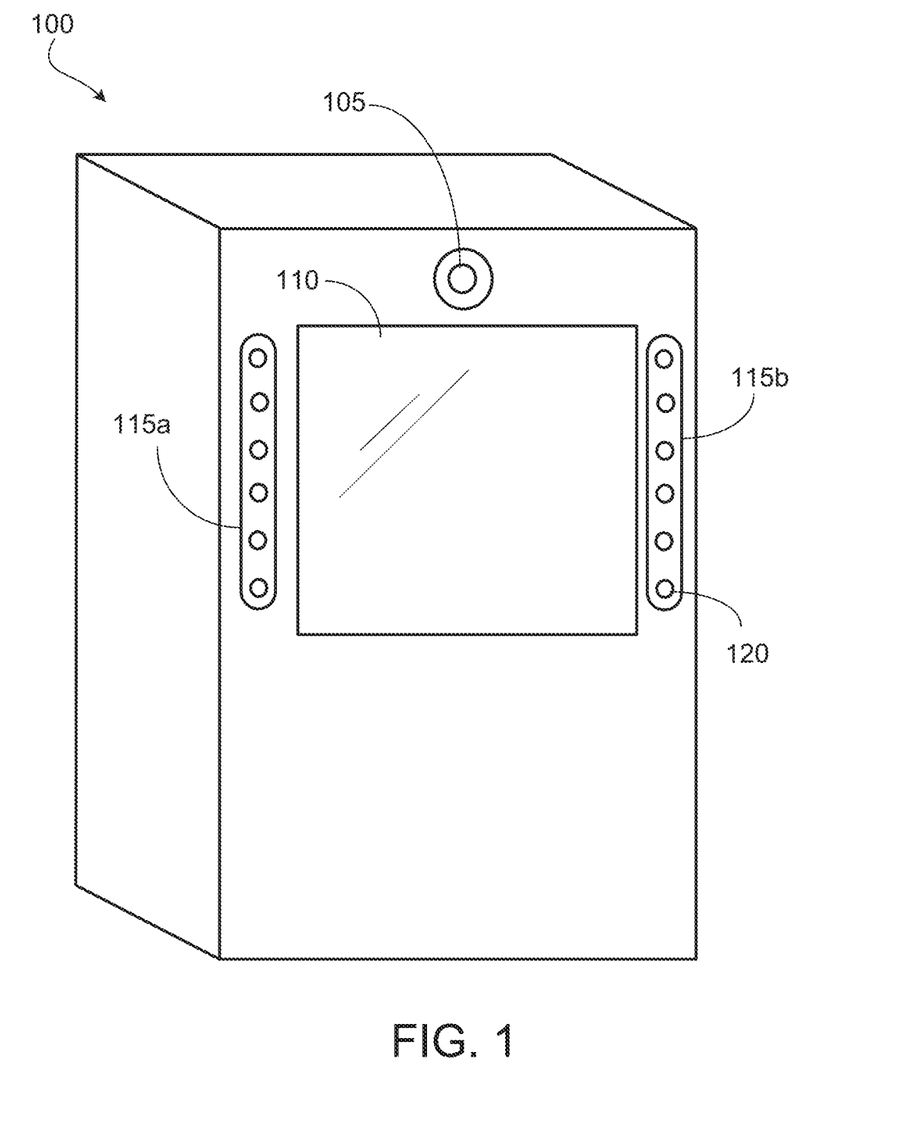
FIG. 1 shows a kiosk machine as an example environment in which the technology described herein may be used.

FIG. 1 shows a kiosk machine 100 as an example environment in which the technology described herein may be used. Such kiosk machines may be used for various purposes that require identifying/verifying users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to identify/verify entrants prior to entering the venue. In general, the kiosk 100 may be deployed at various types of locations to identify/verify users interactively, or even without any active participation of the user.

In some implementations, the kiosk 100 can include one or more components that support a biometric authentication system. For example, the kiosk 100 can include a camera 105 that captures images of users interacting with the kiosk 100. The captured images may be processed to identify/verify valid users, and/or permit or deny access to the services/products being offered through the kiosk. For example, the user 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to verify/identify a pre-stored profile for the user, and the payment for the food may then be automatically deducted from an account linked to the profile.

In some implementations, the images captured using the camera 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/verify a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the content of the images captured using the camera 105 may govern, at least in part, the accuracy and/or efficiency of the underlying biometric authentication system. However, in some cases, it may not be feasible to deploy high-quality and expensive cameras in the kiosks. The technology described herein allows for capturing images under a deterministic illumination pattern, and processing the images to substantially reduce the effects of random ambient lighting. This, in some cases, may allow for implementing an accurate and efficient biometric authentication system even with relatively inexpensive and low-quality cameras.

In some implementations, the kiosk 100 can include at least two illumination sources 115a and 115b (115, in general) that are spatially separated from one another by a known distance, and are configured to generate electromagnetic radiation at multiple wavelengths. For example, the illumination sources 115 can each include one or more light emitting diode (LED) elements 120 that may be controlled to generate electromagnetic radiation patterns or sequences at different wavelength ranges. The wavelength ranges can include the visible spectrum of about 400-700 nm, the NIR spectrum of about 700-1400 nm, and/or near-UV wavelengths in the 320-400 nm range. While the example in FIG. 1 shows only two illumination sources 115 that are physically separated along a horizontal direction, various other configurations are also possible. For example, the illumination sources 115 may be separated along a vertical direction, and/or more than two illumination sources may be used.

Figure 2:
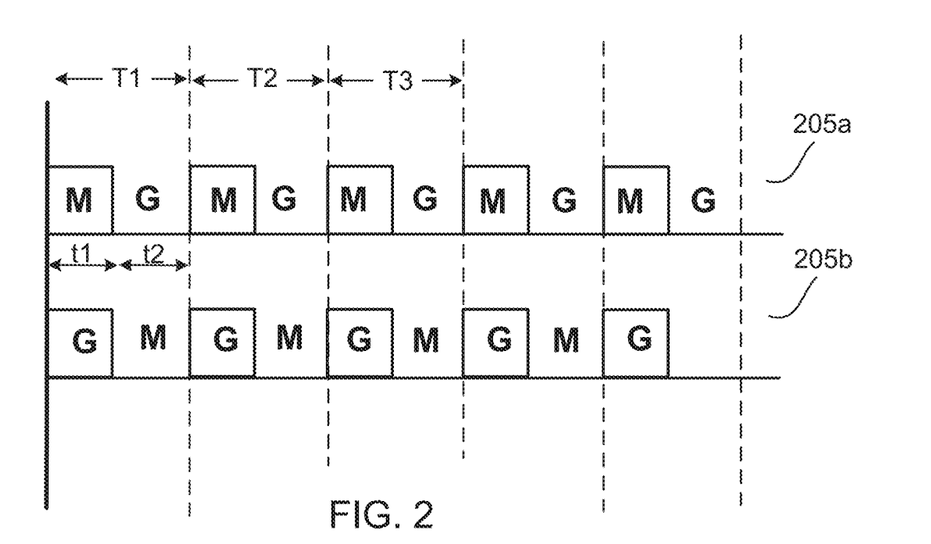
FIG. 2 shows an example set of two illumination sequences that may be generated using two spatially separated illumination sources.

In some implementations, the spatially separated illumination sources 115 can be configured to radiate electromagnetic radiations such that at a given time, the illumination source 115a radiates illumination at a wavelength range that is at least partially non-overlapping with the wavelength range radiated from the illumination source 115b. FIG. 2 shows an example set of two illumination sequences that may be generated using the two spatially separated illumination sources. Specifically, the sequence 205a denotes the illumination sequence radiated by the illumination source 115a and the sequence 205b denotes the illumination sequence radiated by the illumination source 115b. In this example, each of the sequences 205a and 205b (205, in general) is a series of two-bit codes, wherein each bit represents a time period within the duration of the code. In FIG. 2, the total duration of each two-bit code is represented using the periods T1, T2, T3, etc., and the durations of the two bits within the code is represented using the time periods t1 and t2, respectively. While the examples in FIG. 2 represents the time periods t1 and t2 to be substantially equal to each other, the bit durations within a code may also be different from one another. The duration of the time periods t1, t2 can be selected based on particular applications and/or the hardware capabilities. For example, if the camera 105 and the illumination sources 115 support such frequencies, the LED wavelengths can be switched back and forth, for example, at 120 Hz or more, such that the flickering is substantially imperceptible to human users. This would correspond to t1 and t2 being of 8.33 ms duration each.

Each illumination source can be configured to generate the coded light sequence by switching between two or more wavelength ranges. For example, to implement the coded sequence 205a, the illumination source 115a can be configured to radiate electromagnetic radiation in a first wavelength range for the time period t1 and then switch to a second wavelength range for the time period t2. This can be repeated for the subsequent periods T2, T3, etc. Correspondingly, the second illumination source 115b can be configured to radiate electromagnetic radiation in a complementary sequence 205b. Specifically, the illumination source 115b can be configured to radiate electromagnetic radiation in the second wavelength range for the time period t1 and then switch to the first wavelength range for the time period t2, which can then be repeated for the subsequent periods T2, T3, etc., as illustrated in FIG. 2. The second wavelength range is at least partially non-overlapping with the first wavelength range.

Figure 3:
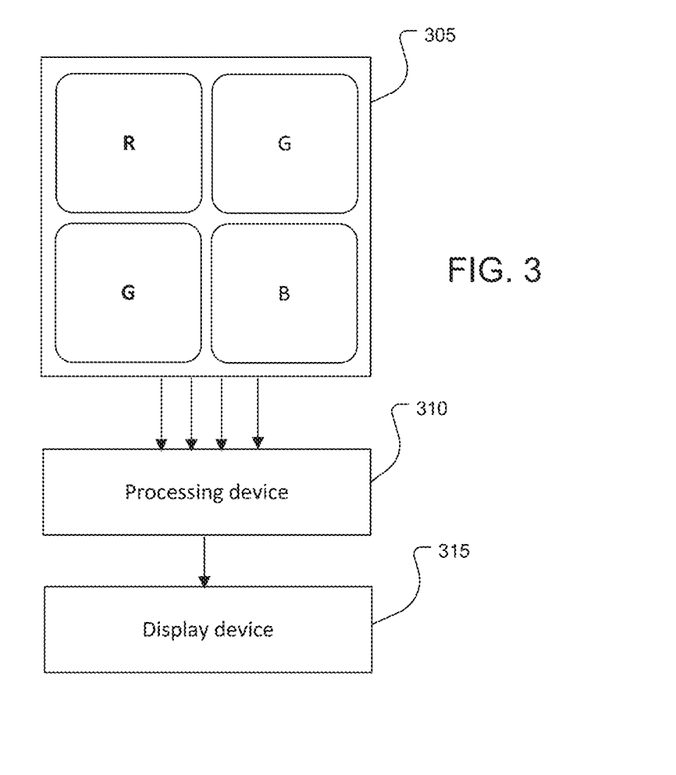
FIG. 3 shows a set of RGB image sensors as an example of sensors that can be used to implement the technology described herein.

In the example shown in FIG. 2, the first wavelength range is centered around a wavelength between wavelengths corresponding to red and blue (which may correspond to the color magenta, and is therefore denoted as M), and the second wavelength range is centered around a wavelength corresponding to green (and therefore denoted as G). The first and second wavelength ranges may be selected in accordance with the sensors used in the camera. For example, the wavelength ranges corresponding to magenta and green are selected in accordance with the example set 305 of RGB image sensors shown in FIG. 3. Specifically, the example of FIG. 3 shows a Bayer pattern of sensors with red (R), green (G) and blue (B) color filters disposed in the arrangement depicted. For the sake of brevity, FIG. 3 illustrates a single set 305 of RGB sensors. However, in practice, multiple sets 305 of such RGB sensors would be used in sensing the illumination received from the illuminated target.

In the example of FIG. 2, the wavelength ranges are chosen such that a sensitivity of a first sensor (e.g., a sensor underlying the R or B color filter) to light in the first wavelength range (e.g., a range centered around a wavelength between red and blue) is substantially higher than a sensitivity of the first sensor to light in the second wavelength range (e.g. a range centered around green), and a sensitivity of a second sensor (e.g., a sensor underlying one of the G color filters) to light in the second wavelength range is substantially higher than a sensitivity of the second sensor to light in the first wavelength range. Because of such selection of wavelength ranges, during the time period t1, the R and B sensors primarily sense the target as illuminated by the illumination source 115a (which, as per the example of FIG. 2, radiates the M wavelength during t1), and the G sensors primarily sense the target as illuminated by the illumination source 115b (which, as per the example of FIG. 2, radiates the G wavelength during t1). The situation is reversed during the time period t2, when the G sensors primarily sense the target as illuminated by the illumination source 115a (which, as per the example of FIG. 2, radiates the G wavelength during t2), and the R and B sensors primarily sense the target as illuminated by the illumination source 115b (which, as per the example of FIG. 2, radiates the M wavelength during t2).

In some implementations, such complementary colorcoded illumination by two spatially separated sources (together with synchronized capture using the camera sensors) means that each sensor of the camera at a given instant senses the target as recorded by a single illumination source. For example, during the first time period t1 of each coded sequence, the R and B sensors sense the target as if illuminated only by the illumination source 115a because the R and B sensors are relatively insensitive to the concurrent G illumination coming from the illumination source 115b. Similarly, during t1, the G sensors sense the target as if illuminated only by the illumination source 115b. Because the illumination sources 115a and 115b are spatially separated, the shadows produced in the two corresponding images are different, and such information can be exploited using a photometric stereo process to generate a 3D reconstruction of the target.

Referring again to FIG. 3, outputs from the set 305 of RGB sensors can be processed using one or more processing devices 310. In some implementations, the output of the one or more processing devices 310 may be used to drive a display device 315. In some implementations, the display device 315 can be the display device 110 of the kiosk described with reference to FIG. 1. In some implementations, the display device 315 can be disposed on a mobile device such as a smartphone, tablet computer, or an e-reader.

The one or more processing devices 310 can be configured to process the outputs from one or more sets 305 of RGB sensors in various ways. In some implementations, the one or more processors 310 are configured to implement a photometric stereo reconstruction process to generate a three dimensional representation of the target. This can include, for example, estimating the surface normals of the target in the two or images that are captured under different lighting conditions, as described above. Because the amount of light reflected by a surface is dependent on the orientation of the surface in relation to the light source and the observer, possible surface orientations can be estimated from one image obtained under a particular illumination condition. From the two or more images obtained under different lighting conditions, the true orientation of a surface may be accurately estimated. In some cases, this is referred to as a shape-from-shading technique, and can be used to estimate a 3D representation of the target captured using the different sensors under the coded light conditions.

In some implementations, the one or more processing devices can be configured to execute one or more matched filtering operations on the output of one or more sensors to enhance the effects due to the corresponding type of illumination. For example, referring again to FIG. 2, the illumination pattern sensed by the R and B filters follows a sequence of 2 digit Barker code (e.g. [1 0], with 1 representing illumination under the M wavelengths, and 0 representing illumination under the G wavelength). Therefore if the output of the R and B sensors are matched filtered using a length 2 Barker code [1 0], the effects due to illumination under the wavelength range M would be enhanced in the filter output as compared to any effects due to illumination wavelengths outside the wavelength range M. If the matched filtering is performed for a few periods (e.g., for periods T1, T2, and T3), and the corresponding outputs are combined, the signal to noise ratio (or the ratio of the effects due to the wavelengths in the range of interest to the effects due to wavelengths outside the range of interest) would be significantly increased, and the resulting image would represent a first image that as if is captured using illumination only in the M wavelength range. Another set of matched filtering may be performed on the output of the G sensors to obtain another image that would represent a second image that as if is captured using illumination only in the G wavelength range. Combining the first image with the second image would therefore represent a final image that as if is captured using only the wavelengths from the controlled illumination sources 115, and in which the noise due to any wideband illumination in the ambience is substantially reduced. Performing feature extraction and biometric authentication using such a final image could potentially significantly improve the underlying authentication process, which in turn can result in a more secure system.

The above example describes matched filtering using a Barker 2 code [1 0] for illustrative purposes. Other codes with good autocorrelation properties may also be used. For example, Barker codes of other lengths (e.g., of lengths 3, 4, 5, 7, 11, or 13) or other non-Barker biphase codes with good mainlobe to sidelobe ratio in their autocorrelation may also be used. In some implementations, where the sensor set includes more than two separately usable sensors, multiphase codes may also be used for the color coding. For example, if a sensor set includes four separate sensors capable of sensing substantially non-overlapping ranges of wavelengths, four separate illumination sources may be color coded in accordance with a quad-phase code to implement the technology described herein. In practice, the choice of code (including the number of phases and/or length) and/or the number of matched filtering operations on each sensor output may depend on the degree of tolerable latency. For example, if the target is expected to be substantially stable over three periods T1, T2, and T3, the matched filtering output over the three periods may be combined to improve the SNR. On the other hand, if the position of the target is expected to shift significantly over the three periods, a smaller number of matched filter outputs may be combined, for example, to avoid blurriness in the final image.

Figure 4:
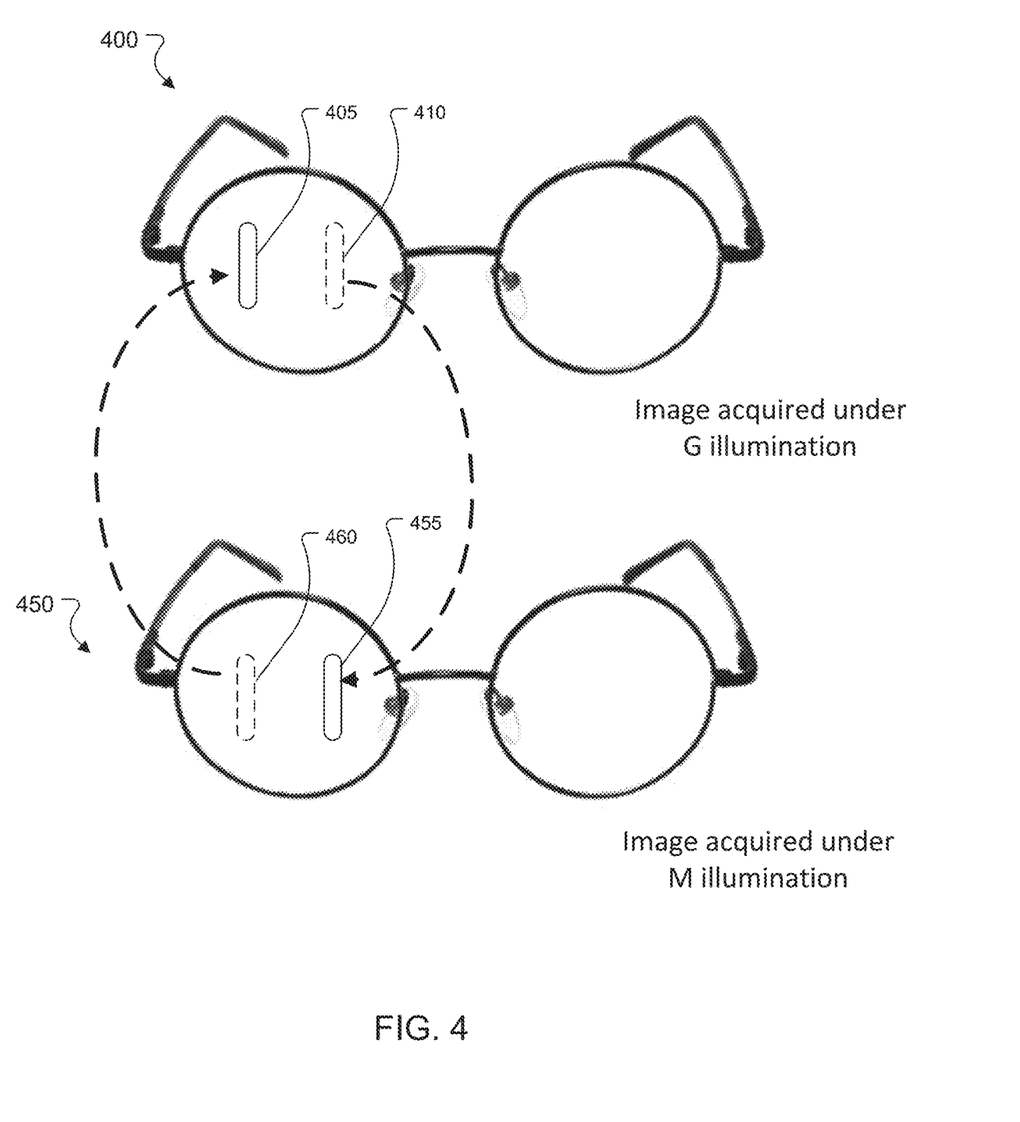
FIG. 4 is an example illustrating the removal of specular reflection from images of eyeglasses using the technology described herein.

In some implementations, reflections (e.g., specular reflections) of an illumination source from a user's eyeglasses may degrade the quality of captured images, and in turn interfere with biometric authentication processes such as those based on detecting iris patterns or eye vasculature. FIG. 4 is an example illustrating the removal of specular reflection from images of eyeglasses using the technology described herein. In this example, the upper image 400 represents an image captured by the R and B sensors during the first time period t1 of the illumination sequence 205a, and hence represents an image that as if is captured using the magenta illumination from the illumination source 115a. The lower image 450 represents an image concurrently captured by the G sensors (i.e., during the same first time period t1), and hence represents an image that as if is captured using the green illumination from the illumination source 115b. Because the R and B sensors are substantially insensitive to the green illumination from the illumination source 115b, the reflection 405 unambiguously represents the specular reflection due to the illumination source 115a. Similarly, because the G sensors are substantially insensitive to the magenta illumination from the illumination source 115a, the reflection 455 unambiguously represents the specular reflection due to the illumination source 115b. Also, because the images 400 and 450 represent the same point in time, the reflections in each image can be removed, for example, by replacing the corresponding pixel values in the image with analogous pixel values from the other image. For example, the pixel values corresponding to the reflection 405 in the image 400 can be replaced by pixel values from an analogous region 460 from the image 450. Similarly, the pixel values corresponding to the reflection 455 in the image 450 can be replaced by pixel values from an analogous region 410 from the image 400. This allows for replacement of pixel values due to specular reflection (which carries little or no meaningful information about the target) with meaningful pixel values that in some cases may improve the underlying biometric authentication process, or simply improve the appearance of the resulting image.

In some implementations, when the two images 400 and 450 are combined to generate the final image, the regions corresponding to the reflections 405 and 455 may exhibit some discontinuity due to the absence of information from one or more color channels. For example, the region corresponding to the reflection 405 would have no information from the R or B channels, and the region corresponding to the reflection 455 would have no information from the G channel. In some implementations, this may be mitigated, for example, by importing the missing information from another image captured close in time. For example, the missing R and B channel information corresponding to the pixel values substituted for the reflection 405 can be obtained from the R and B channel image corresponding to the time period t2. Similarly, the missing G channel information corresponding to the pixel values substituted for the reflection 455 can be obtained from the G channel image corresponding to the time period t2. In some implementation, the images corresponding to the time periods t1 and t2 may be registered with respect to one another to account for any shift in the target's position between the two time periods.

Figure 5:
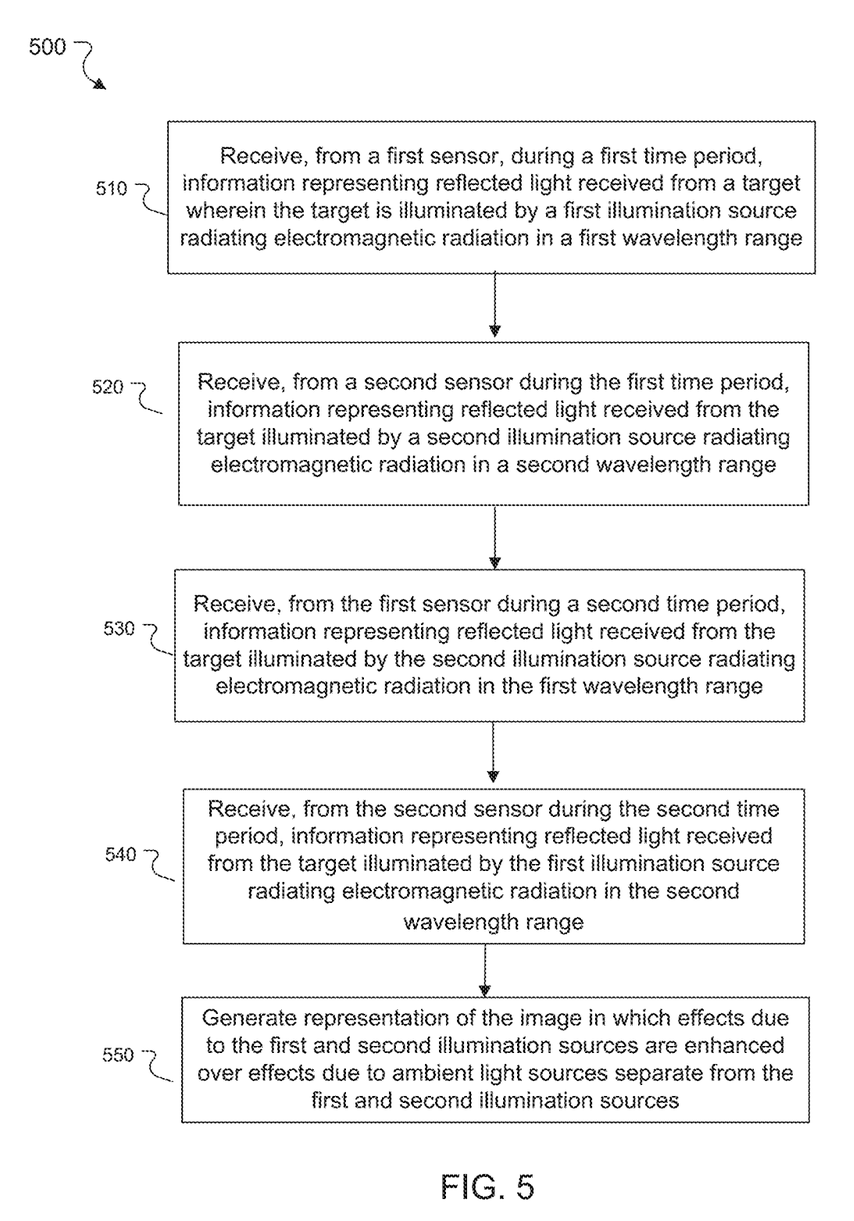
FIG. 5 is a flowchart of an example process for generating a representation of an image that is substantially independent of ambient lighting conditions.

FIG. 5 is a flowchart of an example process for generating a representation of an image that is substantially independent of ambient lighting conditions. In some implementations, at least a portion of the process 500 may be executed by one or more processing devices disposed within a kiosk such as the kiosk 100 described with reference to FIG. 1. In some implementations, at least a portion of the process 500 may be executed at one or more servers (such as servers or computing devices in a distributed computing system) in communication with remote components such as one or more processing devices disposed within a kiosk.

Operations of the process 500 includes receiving, from a first sensor, during a first time period, information representing reflected light received from a target, wherein the target is illuminated by a first illumination source radiating electromagnetic radiation in a first wavelength range (510). Operations of the process 500 also includes receiving, from a second sensor, during the first time period, information representing reflected light received from the target, wherein the target is illuminated by a second illumination source radiating electromagnetic radiation in a second wavelength range (520). The second wavelength range can be at least partially non-overlapping with the first wavelength range. For example, the first wavelength range can be centered around a wavelength between wavelengths corresponding to red and blue, and the second wavelength range can be centered around a wavelength corresponding to green. Correspondingly, the first sensor can include a red (R) or Blue (B) sensor of an RGB camera, and the second sensor can include a green (G) sensor of the RGB camera. The first and second illumination sources may be spatially separated from one another, for example, as for the illumination sources 115a and 115b described with reference to FIG. 1. In some implementations, at least one of the first wavelength range or the second wavelength range can be within the near-infrared (NIR) portion of the electromagnetic radiation spectrum or in the 320-460 nm near UV range. For example, at least one of the first wavelength range or the second wavelength range can be in the 400-420 nm range.

In some implementations, a third illumination source (e.g., a horizontal LED bar disposed above the display device 110 of the kiosk 100 in FIG. 1) can be configured to generate another temporally non-overlapping spectral code with respect to the first and second illumination sources, and portion of such illumination reflected from a target can be received by an appropriate sensor tuned to corresponding spectral characteristics. In one particular example sequence of operations of such a trio of illuminations sources, the first illumination source 115a periodically illuminates with a red-green-blue (R-G-B) sequence, the second illumination source 115b periodically illuminates with a B-R-G sequence, and the third illumination source (not shown in FIG. 1) goes through a G-B-R sequence, such that no two illumination sources are radiating the same wavelength ranges at a given instant of time.

Operations of the process 500 also includes receiving, from the first sensor, during a second time period, information representing reflected light received from the target, wherein the target is illuminated by the second illumination source radiating electromagnetic radiation in the first wavelength range (530) and receiving, from the second sensor, during the second time period, information representing reflected light received from the target, wherein the target is illuminated by the first illumination source radiating electromagnetic radiation in the second wavelength range (540). The second time period can be at least partially non-overlapping with the first time period, and the first and second time periods can constitute two bits of a binary code used in changing the illumination wavelengths of the first and second illumination sources, for example, as described above with reference to FIG. 2. In some implementations, each of the first and second time periods may correspond to a frequency greater than or substantially equal to 120 Hz.

Operations of the process 500 can further include generating, based at least on the information received from the first and second sensors, the representation of the image in which effects due to the first and second illumination sources are enhanced over effects due to ambient light sources separate from the first and second illumination sources. For example, generating the representation of the image can include executing a first matched filtering operation on the information received from the first sensor. The first matched filtering can be based on a binary code used for the illumination patterns, and configured to enhance the effects of illumination by the first wavelength range over the effects of illumination by wavelengths outside the first wavelength range. Similarly, a second matched filtering operation may be performed on the information received from the second sensor, the second matched filtering being based also on the binary code, and configured to enhance the effects of illumination by the second wavelength range over the effects of illumination by wavelengths outside the second wavelength range.

In some implementations, operations of the process 500 may also include generating a three dimensional (3D) representation of the target using a photometric stereo process on the information received from the first and second sensors. In some implementations, the generated representation of the image may be processed to reduce effects of specular reflection. This can include, for example, identifying, in a first image generated based on the information from the first sensor, a region of reflection due to illumination using the first wavelength range, and replacing the pixel values in the region of reflection with pixel values corresponding to a second image generated based on information captured substantially concurrently by the second sensor. This can also include, for example, identifying, in a first image generated based on the information from the second sensor, a region of reflection due to illumination using the second wavelength range, and replacing the pixel values in the region of reflection with pixel values corresponding to a second image generated based on information captured substantially concurrently by the first sensor. In some implementations, such identification and replacement of pixel values may be done, for example, as described above with reference to FIG. 4.

Figure 6:
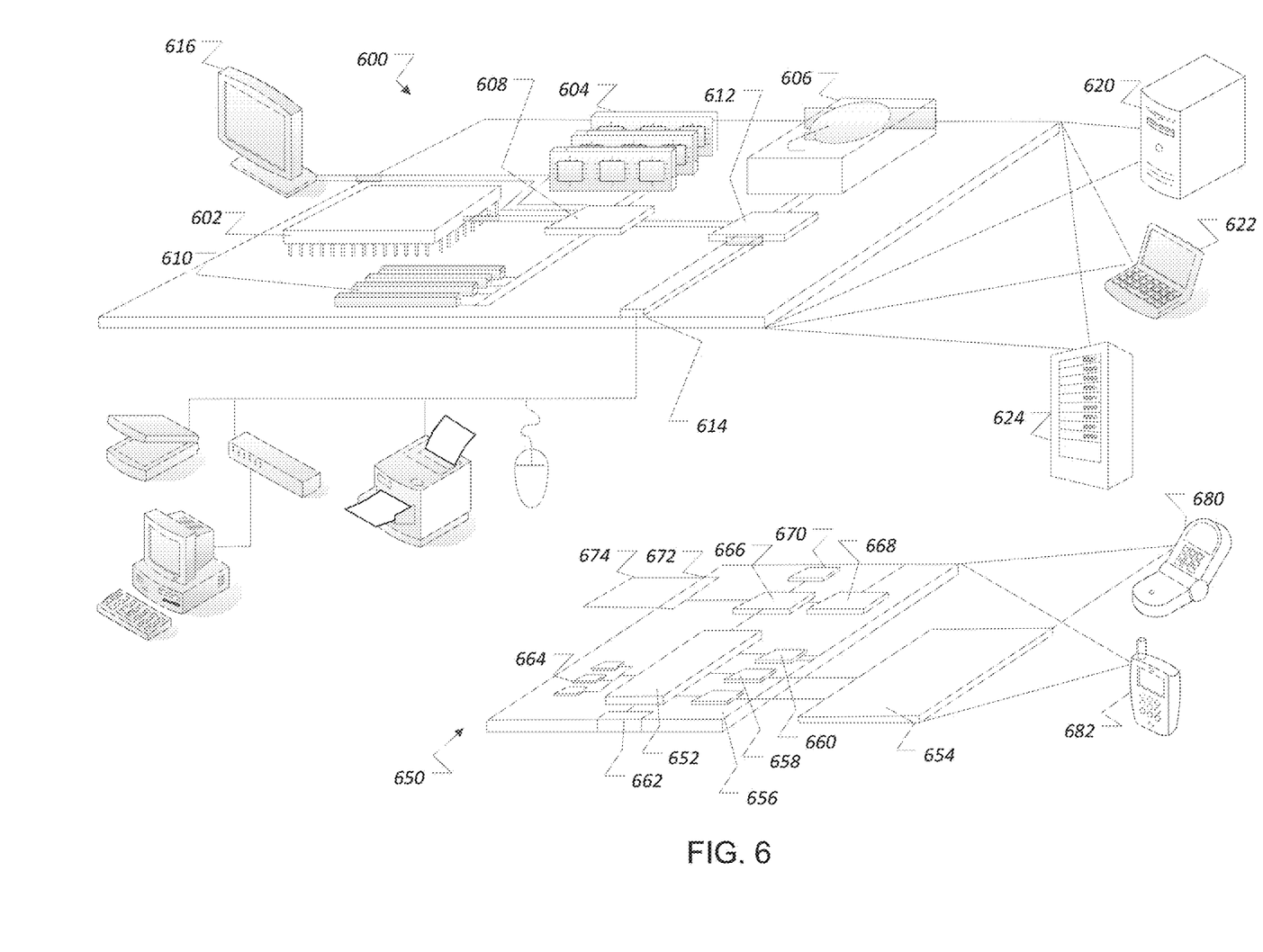
FIG. 6 is a block diagram representing examples of computing devices.

FIG. 6 shows an example of a computing device 600 and a mobile device 650, which may be used with the techniques described here. For example, referring to FIG. 1, the kiosk device 100 can include one or more of the computing device 600 or the mobile device 650, either in part or in its entirety. Computing device 5400 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for generating an image of a target, the method comprising:
   receiving, from a first sensor, during a first time period, information representing reflected light received from the target, wherein the target is illuminated by a first illumination source radiating electromagnetic radiation in a first wavelength range, wherein the first sensor comprises a red (R) or Blue (B) sensor of an RGB camera;
   receiving, from a second sensor, during the first time period, information representing reflected light received from the target, wherein the target is illuminated by a second illumination source radiating electromagnetic radiation in a second wavelength range, wherein the second wavelength range is at least partially non-overlapping with the first wavelength range, and the second illumination source is spatially separated from the first illumination source, wherein the second sensor comprises a green (G) sensor of the RGB camera;
   capturing a first image of the target by the first sensor during the first time period;
   capturing a second image of the target by the second sensor, wherein the second image is captured concurrently to the first image, wherein the target is illuminated with a first coded illumination sequence radiated from the first illumination source and with a second coded illumination sequence radiated from the second illumination source, and wherein the first sensor is substantially insensitive to the second coded illumination sequence of the second illumination source; and
   generating, by one or more processing devices based at least on the information received from the first and second sensors, a first final image and a second final image by combining the first image and the second image, wherein reflections in the first final image due to the first and second illumination sources are removed by replacing pixel values from the first image corresponding to a first reflection of the first illumination source with pixel values from an analogous region in the second image, and wherein reflections in the second final image due to the first and second illumination sources are removed by replacing pixel values from the second image corresponding to a second reflection of the second illumination source with pixel values from an analogous region in the first image.

2. The method of claim 1, further comprising:
   receiving, from the first sensor, during a second time period, information representing reflected light received from the target, wherein the target is illuminated by the second illumination source radiating electromagnetic radiation in the first wavelength range, wherein the second time period is at least partially non-overlapping with the first time period; and receiving, from the second sensor, during the second time period, information representing reflected light received from the target, wherein the target is illuminated by the first illumination source radiating electromagnetic radiation in the second wavelength range.

3. The method of claim 2, further comprising:

obtaining, from a third image captured by the first sensor during the second time period, missing R or B channel information corresponding to pixel values from the first final image that correspond to replaced pixel values corresponding to the first reflection of the first illumination source in the first image; and importing the obtained missing R or B channel information into the first final image.

4. The method of claim 2, wherein the first and second time periods constitute two bits of a binary code used in changing illumination wavelengths of the first and second illumination sources.

5. The method of claim 4, wherein generating the first final image comprises executing a first matched filtering operation on the information received from the first sensor, the first matched filtering operation being based on the binary code, and configured to enhance effects of illumination by the first wavelength range over effects of illumination by wavelengths outside the first wavelength range.

6. The method of claim 1, wherein a sensitivity of the first sensor to light in the first wavelength range is substantially higher than a sensitivity of the first sensor to light in the second wavelength range, and a sensitivity of the second sensor to light in the second wavelength range is substantially higher than a sensitivity of the second sensor to light in the first wavelength range.

7. The method of claim 1, further comprising:

identifying, in the first image generated based on the information from the first sensor, a region of reflection due to the first illumination source using the first wavelength range; and replacing pixel values in the region of reflection with pixel values corresponding to the second image generated based on information captured substantially concurrently by the second sensor, to reduce effects of specular reflection.

8. An imaging system comprising:

a first illumination source controllable to radiate electromagnetic radiation at multiple wavelength ranges;

a second illumination source disposed spatially separated from the first illumination source, the second illumination source controllable to radiate electromagnetic radiation at multiple wavelength ranges; and one or more processing devices configured to:

receive, from a first sensor, during a first time period, information representing reflected light received from a target, wherein the target is illuminated by the first illumination source radiating electromagnetic radiation in a first wavelength range, wherein the first sensor comprises a red (R) or Blue (B) sensor of an RGB camera, receive, from a second sensor, during the first time period, information representing reflected light received from the target, wherein the target is illuminated by the second illumination source radiating electromagnetic radiation in a second wavelength range, which is at least partially non-overlapping with the first wavelength range, wherein the second sensor comprises a green (G) sensor of the RGB camera, capture a first image of the target by the first sensor during the first time period, capture a second image of the target by the second sensor, wherein the second image is captured concurrently to the first image, wherein the target is illuminated with a first coded illumination sequence radiated from the first illumination source and with a second coded illumination sequence radiated from the second illumination source, and wherein the first sensor is substantially insensitive to the second coded illumination sequence of the second illumination source, and generate, based at least on the information received from the first and second sensors, a first final image and a second final image by combining the first image and the second image, wherein reflections in the first final image due to the first and second illumination sources are removed by replacing pixel values from the first image corresponding to a first reflection of the first illumination source with pixel values from an analogous region in the second image, and wherein reflections in the second final image due to the first and second illumination sources are removed by replacing pixel values from the second image corresponding to a second reflection of the second illumination source with pixel values from an analogous region in the first image.

9. The system of claim 8, wherein the one or more processing devices are further configured to:

receive, from the first sensor, during a second time period, information representing reflected light received from the target, wherein the target is illuminated by the second illumination source radiating electromagnetic radiation in the first wavelength range, wherein the second time period is at least partially non-overlapping with the first time period, and receive, from the second sensor, during the second time period, information representing reflected light received from the target, wherein the target is illuminated by the first illumination source radiating electromagnetic radiation in the second wavelength range.

10. The system of claim 9, wherein the one or more processing devices are further configured to:

obtain, from a third image captured by the first sensor during the second time period, missing R or B channel information corresponding to pixel values from the first final image that correspond to replaced pixel values corresponding to the first reflection of the first illumination source in the first image; and import the obtained missing R or B channel information into the first final image.

11. The system of claim 8, further comprising:

a display device on which at least one of the first final image and the second final image is presented; and a camera that includes the first and second sensors.

12. The system of claim 8, wherein the first illumination source and the second illumination source are disposed in a kiosk.

13. The system of claim 8, wherein the first and second time periods constitute two bits of a binary code used in changing illumination wavelengths of the first and second illumination sources.

14. The system of claim 13, wherein the one or more processing devices are configured to execute a first matched filtering operation on the information received from the first sensor, the first matched filtering operation being based on the binary code, and configured to enhance the effects of illumination by the first wavelength range over the effects of illumination by wavelengths outside the first wavelength range.

15. One or more machine-readable storage devices having encoded thereon computer readable instructions for causing one or more processing devices to perform operations comprising:
receiving, from a first sensor, during a first time period, information representing reflected light received from a target, wherein the target is illuminated by a first illumination source radiating electromagnetic radiation in a first wavelength range, wherein the first sensor comprises a red (R) or Blue (B) sensor of an RGB camera;
receiving, from a second sensor, during the first time period, information representing reflected light received from the target, wherein the target is illuminated by a second illumination source radiating electromagnetic radiation in a second wavelength range, wherein the second wavelength range is at least partially non-overlapping with the first wavelength range, and the second illumination source is spatially separated from the first illumination source, wherein the second sensor comprises a green (G) sensor of the RGB camera; and
capturing a first image of the target by the first sensor during the first time period,
capturing a second image of the target by the second sensor, wherein the second image is captured concurrently to the first image, wherein the target is illuminated with a first coded illumination sequence radiated from the first illumination source and with a second coded illumination sequence radiated from the second illumination source, and wherein the first sensor is substantially insensitive to the second coded illumination sequence of the second illumination source, and
generating, based at least on the information received from the first and second sensors, a first final image and a second final image by combining the first image and the second image, wherein reflections in the first final image due to the first and second illumination sources are removed by replacing pixel values from the first image corresponding to a first reflection of the first illumination source with pixel values from an analogous region in the second image, and wherein reflections in the second final image due to the first and second illumination sources are removed by replacing pixel values from the second image corresponding to a second reflection of the second illumination source with pixel values from an analogous region in the first image.

16. The machine-readable storage devices of claim 15, wherein the operations comprise:
receiving, from the first sensor, during a second time period, information representing reflected light received from the target, wherein the target is illuminated by the second illumination source radiating electromagnetic radiation in the first wavelength range, wherein the second time period is at least partially non-overlapping with the first time period; and
receiving, from the second sensor, during the second time period, information representing reflected light received from the target, wherein the target is illuminated by the first illumination source radiating electromagnetic radiation in the second wavelength range.

17. The machine-readable storage devices of claim 16, wherein the operations comprise:
obtaining, from a third image captured by the first sensor during the second time period, missing R or B channel information corresponding to pixel values from the first final image that correspond to replaced pixel values corresponding to the first reflection of the first illumination source in the first image; and
importing the obtained missing R or B channel information into the first final image.

18. The machine-readable storage devices of claim 16, wherein the first and second time periods constitute two bits of a binary code used in changing illumination wavelengths of the first and second illumination sources.

19. The machine-readable storage devices of claim 18, wherein generating the first final image comprises executing a first matched filtering operation on the information received from the first sensor, the first matched filtering operation being based on the binary code, and configured to enhance effects of illumination by the first wavelength range over effects of illumination by wavelengths outside the first wavelength range.

20. The machine-readable storage devices of claim 15, wherein the operations comprise:
identifying, in the first image generated based on the information from the first sensor, a region of reflection due to the first illumination source using the first wavelength range; and
replacing pixel values in the region of reflection with pixel values corresponding to the second image generated based on information captured substantially concurrently by the second sensor, to reduce effects of specular reflection.

* * * * *